United States Patent
Joshi et al.

(10) Patent No.: US 12,379,999 B1
(45) Date of Patent: Aug. 5, 2025

(54) DATA INTEGRITY MONITORING

(71) Applicant: INTERNATIONAL BUSINESS MACHINES CORPORATION, Armonk, NY (US)

(72) Inventors: Santhosh S. Joshi, Hyderabad (IN); Jes Kiran Chittigala, Kukatpally (IN); Adhish Kapoor, Ludhiana (IN)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 18/430,079

(22) Filed: Feb. 1, 2024

(51) Int. Cl.
 *G06F 12/00* (2006.01)
 *G06F 11/07* (2006.01)
 *G06F 11/14* (2006.01)

(52) U.S. Cl.
 CPC ...... *G06F 11/1448* (2013.01); *G06F 11/0766* (2013.01); *G06F 11/1469* (2013.01)

(58) Field of Classification Search
 CPC ............. G06F 11/1448; G06F 11/0766; G06F 11/1469; G06F 11/1446; G06F 11/1471; G06F 12/16; G06F 3/0655; G06F 3/0662; G06F 9/455; G06F 9/4856
 See application file for complete search history.

(56) References Cited

U.S. PATENT DOCUMENTS

| | | | |
|---|---|---|---|
| 10,516,688 B2 | 12/2019 | Tamir | |
| 11,238,157 B2 | 2/2022 | Saad | |
| 2007/0186127 A1* | 8/2007 | Desai | G06F 11/1448 714/13 |
| 2014/0149983 A1* | 5/2014 | Bonilla | G06F 3/0619 718/1 |
| 2018/0011871 A1* | 1/2018 | Kroll | G06F 8/65 |
| 2019/0213267 A1* | 7/2019 | Agarwal | G06F 11/1458 |
| 2022/0374519 A1 | 11/2022 | Botelho | |
| 2023/0164154 A1 | 5/2023 | Jayawardena | |

* cited by examiner

*Primary Examiner* — Shawn X Gu
(74) *Attorney, Agent, or Firm* — Eric W. Chesley

(57) ABSTRACT

Described are techniques for data integrity monitoring of point-in-time backups. The techniques include obtaining a point-in-time backup of a virtual computing resource that executes in a computing environment which is monitored by a controller component of a disaster recovery system. The techniques further include starting a temporary virtual computing resource in a virtual private network from the point-in-time backup of the virtual computing resource. The techniques further include establishing communication between the controller component and the temporary virtual computing resource to enable the controller component to initiate an integrity check of data included in the point-in-time backup. The techniques further include, in response to an indication that the point-in-time backup passed the integrity check, preserving the point-in-time backup as a validated safe backup of the virtual computing resource.

20 Claims, 6 Drawing Sheets

DATA INTEGRITY MONITORING

BACKGROUND

The present disclosure relates to cybersecurity, and, more specifically, to monitoring data for cybersecurity threats.

File integrity monitoring (FIM) is a technique for continuously comparing a current state of system files, databases, and applications to a known, healthy baseline. For example, FIM regularly checks data for unauthorized modifications, file alterations, and/or malware infections. The goal of FIM is to detect discrepancies in the data and trigger a timely alert that prompts a security team to investigate and take corrective action before any harm can be done. When implemented, FIM can serve as an effective line of defense against cybersecurity threats to a system, such as malware, to safeguard sensitive data and system stability by monitoring the integrity of the system's digital assets.

SUMMARY

Aspects of the present disclosure are directed toward a computer-implemented method for data integrity monitoring of point-in-time backups. The computer-implemented method comprising obtaining a point-in-time backup of a virtual computing resource that executes in a computing environment which is monitored by a controller component of a disaster recovery system. The computer-implemented method further comprising starting a temporary virtual computing resource in a virtual private network from the point-in-time backup of the virtual computing resource. The computer-implemented method further comprising establishing communication between the controller component and the temporary virtual computing resource to enable the controller component to initiate an integrity check of data included in the point-in-time backup. The computer-implemented method further comprising, in response to an indication that the point-in-time backup passed the integrity check, preserving the point-in-time backup as a validated safe backup of the virtual computing resource.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
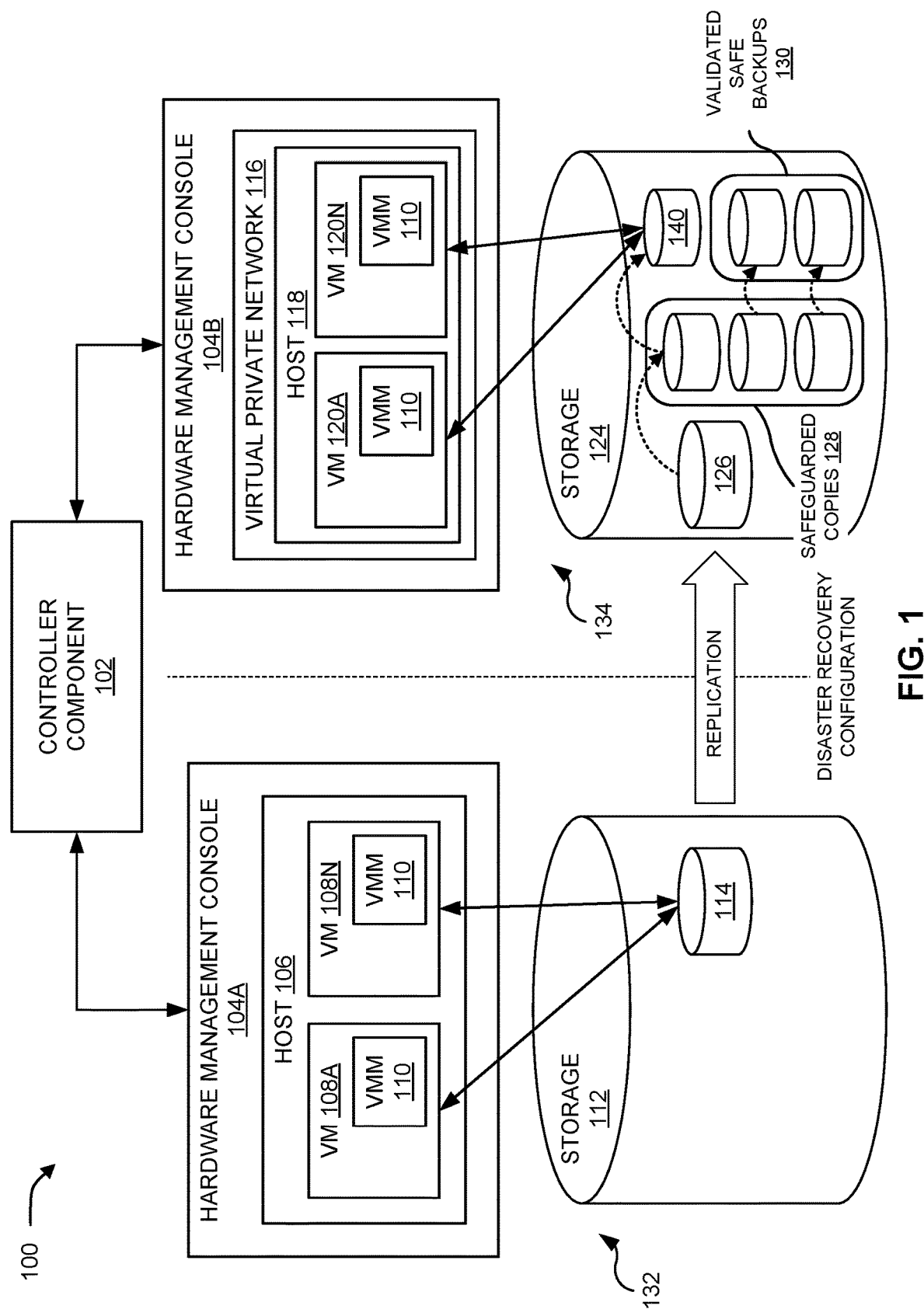
FIG. 1 is a block diagram illustrating an example computational environment implementing data integrity monitoring of point-in-time backups, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward data integrity monitoring of point-in-time backups. While not limited to such applications, embodiments of the present disclosure may be better understood in light of the aforementioned context.

Disaster recovery for computer systems is a set of processes and tools designed to restore a system and mitigate downtime in the event of a disaster, such as a system failure, cyberattacks, and the like. For example, a disaster recovery technique can regularly backup a system's data and replicate it to a secondary site. In the event of a system incident, the disaster recovery technique can activate a backup of the system to restore essential system data. However, in cases where the system is exposed to malware, the malware can compromise the data included in a backup of the system, which makes the backup unfit for restoring the system to the point-in-time of the backup, and thereby undermines the disaster recovery technique. Advantageously, aspects of the present disclosure overcome this, and other challenges, by performing data integrity monitoring of backups of virtual computing resources (virtual machines and/or containers).

According to an aspect of the present disclosure, there is provided a system including one or more computer readable storage media storing program instructions and one or more processors which, in response to executing the program instructions, are configured to obtain a point-in-time backup of a virtual computing resource that executes in a computing environment which is monitored by a controller component of a disaster recovery system. The program instructions and the one or more processors, in response to executing the program instructions, are further configured to start a temporary virtual computing resource in a virtual private network from the point-in-time backup of the virtual computing resource and establish communication between the controller component and the temporary virtual computing resource to enable the controller component to initiate an integrity check of data included in the point-in-time backup. In response to an indication that the point-in-time backup passed the integrity check, the program instructions and the one or more processors, in response to executing the program instructions, are further configured to preserve the point-in-time backup as a validated safe backup of the virtual computing resource. Advantageously, the aforementioned system increases the integrity of a point-in-time backup by performing an integrity check using a temporary virtual computing resource started from the point-in-time backup in a virtual private network to ensure that the backup has not been compromised by malware.

According to an aspect of the system, the program instructions are further configured to cause the one or more processors to, in response to an indication that the point-in-time backup failed the integrity check, provide a notification to indicate that the point-in-time backup failed the integrity check, and delete the point-in-time backup of the virtual computing resource. Advantageously, the aforementioned aspect of the system ensures that a point-in-time backup that may have been compromised by malware is deleted, thereby reducing a possibility that a compromised point-in-time backup could be used to restore the virtual computing resource.

According to an aspect of the system, the program instructions are further configured to cause the one or more processors to, in response to an indication that the point-in-time backup failed the integrity check, identify a last validated safe backup of the virtual computing resource, and initiate a recovery of the virtual computing resource using the last validated safe backup of the virtual computing resource. Advantageously, the aforementioned embodiment of the system reduces downtime associated with a disaster by restoring the virtual computing resource using a point-in-time backup that has been validated as being safe.

According to an aspect of the system, the program instructions configured to cause the one or more processors to obtain the point-in-time backup of the virtual computing resource are further configured to cause the one or more processors to identify a most current point-in-time backup of the virtual computing resource generated by the disaster recovery system, where the disaster recovery system recurrently generates point-in-time backups of the virtual computing resource to include application data and configuration information for the virtual computing resource, and safeguard the most current point-in-time backup. Advantageously, the aforementioned embodiment of the system increases the integrity of point-in-time backups by safeguarding a most current backup of the virtual computing resource from being compromised, either accidentally or deliberately.

According to an aspect of the system, the program instructions configured to cause the one or more processors to start the temporary virtual computing resource in the virtual private network are further configured to cause the one or more processors to create the virtual private network in a high-availability computing environment that hosts the virtual computing resource, and generate an alternative world wide port name (WWPN) for connecting the temporary virtual computing resource to storage containing the point-in-time backup. Advantageously, the aforementioned embodiment of the system isolates the temporary virtual computing resource from other components in the high-availability computing environment by using the WWPN to connect the temporary virtual computing resource to the storage containing the point-in-time backup, thereby protecting production data from being changed by the temporary virtual computing resource.

According to an aspect of the system, the program instructions are further configured to cause the one or more processors to delete the temporary virtual computing resource after the integrity check has been performed. Advantageously, the aforementioned embodiment of the system releases computing resources used by the temporary virtual computing resource back to the system.

According to an aspect of the system, the program instructions configured to cause the one or more processors to preserve the point-in-time backup as the validated safe backup of the virtual computing resource are further configured to cause the one or more processors to identify a safeguard policy that defines parameters for creating and retaining validated safe backups of the virtual computing resource, and manage the validated safe backups of the virtual computing resource according to the parameters of the safeguard policy. Advantageously, the aforementioned embodiment of the system increases the efficiency and effectiveness of the disaster recovery system by managing the validated safe backups according to the safeguard policy.

Additional aspects of the present disclosure are directed to computer-implemented methods configured to perform any of the functionality of any of the aspects of the aforementioned system, thereby realizing the associated advantages, improvements, and/or technical effects, previously described. Also, additional aspects of the present disclosure are directed to computer program products comprising one or more computer readable storage media, and program instructions collectively stored on the one or more computer readable storage media, the program instructions configured to cause one or more processors to perform any of the functionality of any of the aspects of the aforementioned system, thereby realizing the associated advantages, improvements, and/or technical effects, previously described.

Aspects of the present disclosure can be relevant to multiple technical use cases. In one example technical use case, a disaster recovery system provides data protection against ransomware attacks using a controller to replicate a virtual machine disk to a disaster recovery site, and then create a safeguarded copy of the virtual machine disk. Thereafter, a cloned copy is created from the safeguarded copy of the virtual machine disk, and a temporary virtual machine is started (booted) from the cloned copy. As part of starting the temporary virtual machine, a monitor application (e.g., a virtual machine monitor) is launched on the temporary virtual machine, which establishes communication with the controller of the disaster recovery system and exchanges relevant information between the controller and temporary virtual machine. After establishing communication, the controller then initiates an integrity check by causing the temporary virtual machine to execute applications and/or scripts configured to perform data validity and integrity checks. After verifying the data integrity of the cloned copy of the virtual machine disk, the cloned copy is safeguarded as a validated safe backup. The temporary virtual machine is then deleted. In the event of a validation failure, the validated safe backup is used to restore the virtual machine to a point-in-time of the validated safe backup.

Accordingly, the aspects of the present disclosure described above provide an improvement in the technical field of cybersecurity generally, and more particularly, in the technical field of data integrity monitoring of point-in-time system backups.

Referring now to the figures, FIG. 1 illustrates a block diagram of an example computational environment 100 that can implement data integrity monitoring of point-in-time backups of virtual computing resources, in accordance with some embodiments of the present disclosure. As illustrated, the computational environment 100 can include a controller component 102 of a disaster recovery system, which can be configured to manage disaster recovery operations for a production environment 132 and a backup environment 134. As background, a disaster recovery system can comprise a set of policies, tools, and procedures designed to enable an organization to restore information technology (IT) infrastructure and services following a disruptive event in an attempt to ensure service continuity and mitigate data loss and downtime. Illustratively, the disaster recovery system can perform backup and replication of production resources; provide a recovery site to restore the production resources; preform failover and recovery orchestration; and perform testing and validation.

The controller component 102 of the disaster recovery system is responsible for recovery actions in the event of a disaster or a potential disaster to the production environment 132. The production environment 132 can comprise a computing environment in which software products and/or services are put into operation for use by end users. In some embodiments, the production environment 132 can be hosted in a public or private cloud environment. The controller component 102 monitors the production environment 132 for unplanned outage that affects a production site or disk subsystems. If an unplanned outage occurs, the controller component 102 analyzes the situation to determine the status of the production environment 132. The controller component 102 can handle discovery, verification, monitoring, notification, and recovery operations to support disaster recovery for the disaster recovery system.

As shown in FIG. 1, the production environment 132 includes a hardware management console 104A, a host 106 for hosting one or more virtual computing resources, and storage 112, which can comprise a storage subsystem. As referred to herein, a virtual computing resource can be a virtual machine or a container. A virtual machine comprises a virtualized computer system that provides the functionality of a physical computer. A container virtualizes an operating system by way of a package of software that contains the elements to execute in any environment. The example illustrated in FIG. 1 is implemented in the context of virtual machines. However, as will be appreciated, the illustrated example can be implemented in the context of containers.

The hardware management console 104A can comprise a physical or virtual appliance configured to control aspects of a host 106. Illustratively, a system administrator can manage systems and partitions using the hardware management console 104A. For example, the system administrator can create and manage logical partitions, activate capacity upgrade on demand, manage servers from a hardware perspective, and manage virtual machines 108A, 108N (collectively 108, where N can refer to any positive integer representing any number of virtual machines). A host 106 can comprise a managed system that includes a physical server and the resources connected to the physical server, including storage 112. The controller component 102 interacts with the hardware management console 104A to collect configuration information of the host 106. Also, the controller component 102 interacts with a virtual machine 108 through the hardware management console 104A and a virtual machine monitor (VMM) 110 to obtain storage configuration information of the virtual machine 108. In some embodiments, a virtual machine monitor 110 is a component of a virtual machine and is responsible for monitoring the virtual machine and applications running on the virtual machine. The virtual machine monitor 110 enables the controller component 302 to discover a respective virtual machine, obtain information about applications installed on the virtual machine, and initiate/terminate applications, scripts, etc. installed on the virtual machine.

The controller component 102 regularly creates backups of the system state and data of the production environment 132, and replicates the backups to the backup environment 134, which can be located on premises or off premises (e.g., a cloud environment). The backup environment 134 can comprise a redundant system of the software products and/or services hosted in the production environment 132.

In the example shown in FIG. 1, the controller component 102 creates point-in-time backups 114 of the virtual machines 108 hosted on the host 106. Synchronous or asynchronous replication can be used to create the point-in-time backups 114. In some embodiments, a point-in-time backup 114 for a virtual machine(s) 108 can comprise a snapshot of the virtual machine(s) 108, where the snapshot is a point-in-time image of the system state and data of the virtual machine 108).

As shown, point-in-time backups 114 of the virtual machine(s) 108 are replicated to the backup environment 134. The replicated backups 126 are then safeguarded to prevent the replicated backups 126 from being compromised, either accidentally or deliberately. In some embodiments, a safeguarded copy function can be used to create cyber-resistant safeguarded copies 128 of the replicated backups 126. The safeguarded copy function isolates the safeguarded copies 128 from production data (located on storage 112), so that even as data in the production environment 132 changes, the data of the safeguarded copies 128 is not changed. As shown in FIG. 1, a series of safeguarded copies 128 can be stored on the storage 124 of the backup environment 134, where each of the safeguarded copies 128 is a different point-in-time incremental or full backup of the virtual machine(s) 108 located in the production environment 132.

As described earlier, in cases where production system data is exposed to malware, the malware can compromise the data in a point-in-time backup 114. In order to ensure that safeguarded copies 128 do not include data compromised by malware, the controller component 102 can perform data integrity monitoring of the safeguarded copies 128 by testing and validating the data in the safeguarded copies 128. For example, as described in more detail in association with FIG. 2, the controller component 102 can create a cloned copy 140 (e.g., a direct disk-to-disk copy) of a safeguarded copy 128, and the controller component 102 can start (boot) one or more temporary virtual machines 120A, 120N (collectively 120, where N can refer to any positive integer representing any number of virtual machines) in a virtual private network 116 using the cloned copy 140. The controller component 102 can then initiate an integrity check to be performed by the temporary virtual machine(s) 120. For safeguarded copies that pass the integrity check, the controller component 102 can protect the safeguarded copies 128 (e.g., via isolation) as validated safe backups 130, enabling the validated safe backups 130 to be used to restore the respective virtual machine(s) 108 in the event of a disaster.

Figure 2:
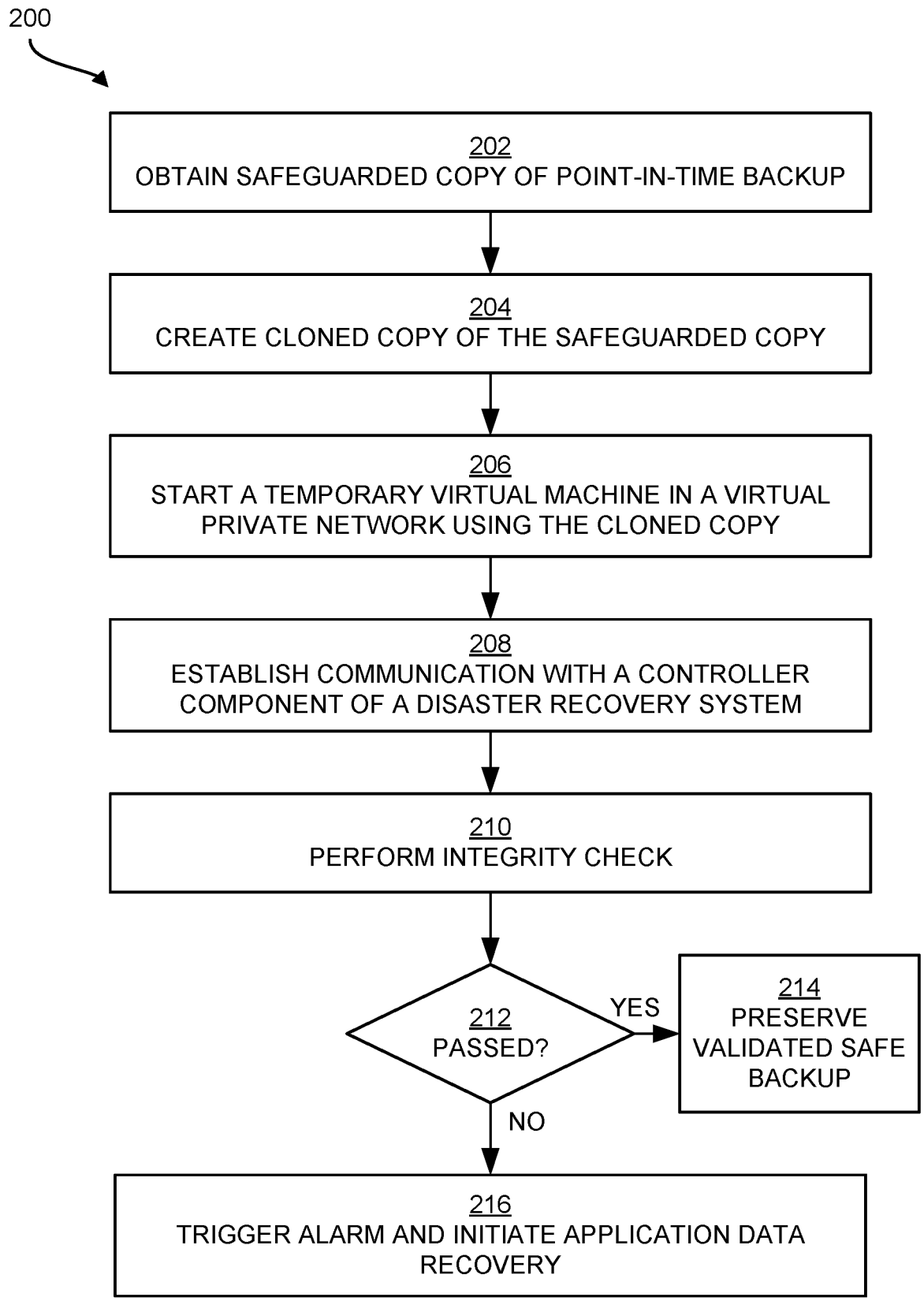
FIG. 2 is a flow diagram illustrating an example a method for data integrity monitoring, in accordance with some embodiments of the present disclosure.

With continuing reference to FIG. 1, FIG. 2 illustrates an example of a method 200 for data integrity monitoring, which can be performed by the controller component 102 to test and validate point-in-time backups 114. In operation 202, the method 200 obtains a safeguarded copy 128 of a point-in-time backup 114. As described earlier, the controller component 102 regularly creates point-in-time backups 114 of the virtual machines 108 hosted in the production environment 132, and replicates the point-in-time backups 114 to the storage 124 located in the backup environment 134. As part of the replication process, the replicated backups 126 can be safeguarded (shown as safeguarded copies 128), as described above.

In response to replicating a point-in-time backup 114 to the storage 124 of the backup environment 134, the method 200 obtains a safeguarded copy 128 of the replicated backup 126, and in operation 204, the method 200 creates a cloned copy 140 of the safeguarded copy 128. The cloned copy 140 comprises a direct disk-to-disk copy of the safeguarded copy 128.

In operation 206, the method 200 starts one or more temporary virtual machines 120 in a virtual private network 116 using the cloned copy 140, which includes the system state and data of the virtual machine(s) 108 located in the production environment 132 captured in the point-in-time backup 114. The virtual private network 116 is configured to isolate the temporary virtual machine(s) 120 from the production environment 132, such that network traffic generated by the temporary virtual machine(s) 120 cannot reach the production resources (e.g., web servers and applications) in the production environment 132.

The temporary virtual machine(s) 120 can be created to have the same configuration as the virtual machine(s) 108 located in the production environment 132. This can be accomplished by starting (booting) the temporary virtual machine(s) 120 from the cloned copy 140, which creates an exact copy of the virtual machine(s) 108 located in the production environment 132 at the point-in-time when the system state and data of the virtual machine(s) 108 was replicated.

In operation 208, the method 200 establishes communication with the controller component 102 of a disaster recovery system. As part of starting the temporary virtual machine(s) 120 from the cloned copy 140, the method 200 starts the virtual machine monitor 110, and thereafter, the virtual machine monitor 110 establishes communication with the controller component 102. As shown, the backup environment 134 includes a hardware management console 104B. The controller component 102 interacts with the hardware management console 104B to communicate with the temporary virtual machine(s) 120 through the virtual machine monitor 110.

In operation 210, the method 200 performs an integrity check of the data included in the point-in-time backup 114. In response to establishing communication with the temporary virtual machine(s) 120 via the virtual machine monitor 110, the controller component 102 initiates an integrity check of the data included in the point-in-time backup 114. For example, the controller component 102 can initiate, via the virtual machine monitor 110, one or more scripts and/or applications on the temporary virtual machine(s) 120 that perform the integrity check. The scripts and/or applications can check the integrity, consistency, and correctness of the data captured in the point-in-time backup 114 to ensure that the data is in a usable and functional state. Examples of integrity checks include, but are not limited to, checksum verification, file comparison, metadata validation, and readability testing. Checksum verification calculates a unique code (checksum) for each file or data block included in a point-in-time backup 114. During an integrity check, the checksum is recalculated and compared to the original checksum, and a mismatch between the two indicates potential data corruption. File comparison compares the files in a point-in-time backup 114 with protected sources and identifies discrepancies. Metadata validation verifies metadata (e.g., file names, sizes, timestamps, locations, etc.) of a point-in-time backup 114 for consistency. Readability testing attempts to read files in a point-in-time backup 114 to detect accessibility issues that may be related to a malware attack. As will be appreciated, an integrity check used by the method 200 can include any technique to verify the reliability and completeness of data captured in a point-in-time backup 114.

An integrity check performed on a temporary virtual machine 120 can include one or more processes that verify the reliability and completeness of the data captured in a point-in-time backup 114, and ensure that the data is in good condition and can be restored successfully if needed. Because data corruption can happen due to malware, corrupted backups cannot be used to restore a system. Illustratively, ransomware is malware used to deny an owner access to their data by encrypting the data. An attacker withholds a key for decrypting the data until a ransom payment is made. The ransomware can be disguised as legitimate files, data, and/or programs, which when unknowingly activated by a user, can encrypt the data in a system's backups. As such, the encrypted data in the system backups cannot be used to restore the system. Performing regular integrity checks can detect malware early, allowing for corrective action to be performed.

Returning to operation 210, the results (e.g., pass/fail, error/timeout, etc.) of an integrity check can be provided to the controller component 102, via the virtual machine monitor 110. In operation 212, the method 200 determines whether, based on the results of the integrity check, the data captured in the point-in-time backup 114 passed the integrity check. For example, the controller component 102 can evaluate the results of the integrity check, and if the data captured in the point-in-time backup 114 passed the integrity check, then in operation 214, the method 200 preserves the safeguarded copy 128 of the point-in-time backup 114 as a protected validated safe backup 130, and the validated safe backup 130 can be used to restore the virtual machine(s) 108 in the event of a disaster.

In some embodiments, a safeguard policy that defines parameters for creating and retaining safe backups can be used to preserve point-in-time backups 114 which have passed integrity checks. Illustratively, the safeguard policy can include backup frequency, backup method (e.g., full, incremental, etc.), backup location, security and access control, and other parameters. The controller component 102 can use the safeguard policy to manage validated safe backups 130 according to the parameters of the safeguard policy.

Returning to operation 212, in the case that the results of the integrity check indicate that the data captured in the point-in-time backup 114 did not pass the integrity check, then in operation 216, the method 200 triggers an alarm and initiates an application data recovery. For example, the controller component 102 can notify a system administrator, who can then initiate an application data recovery procedure that restores the virtual machine(s) 108 to a point-in-time of a last validated safe backup 130.

Figure 3:
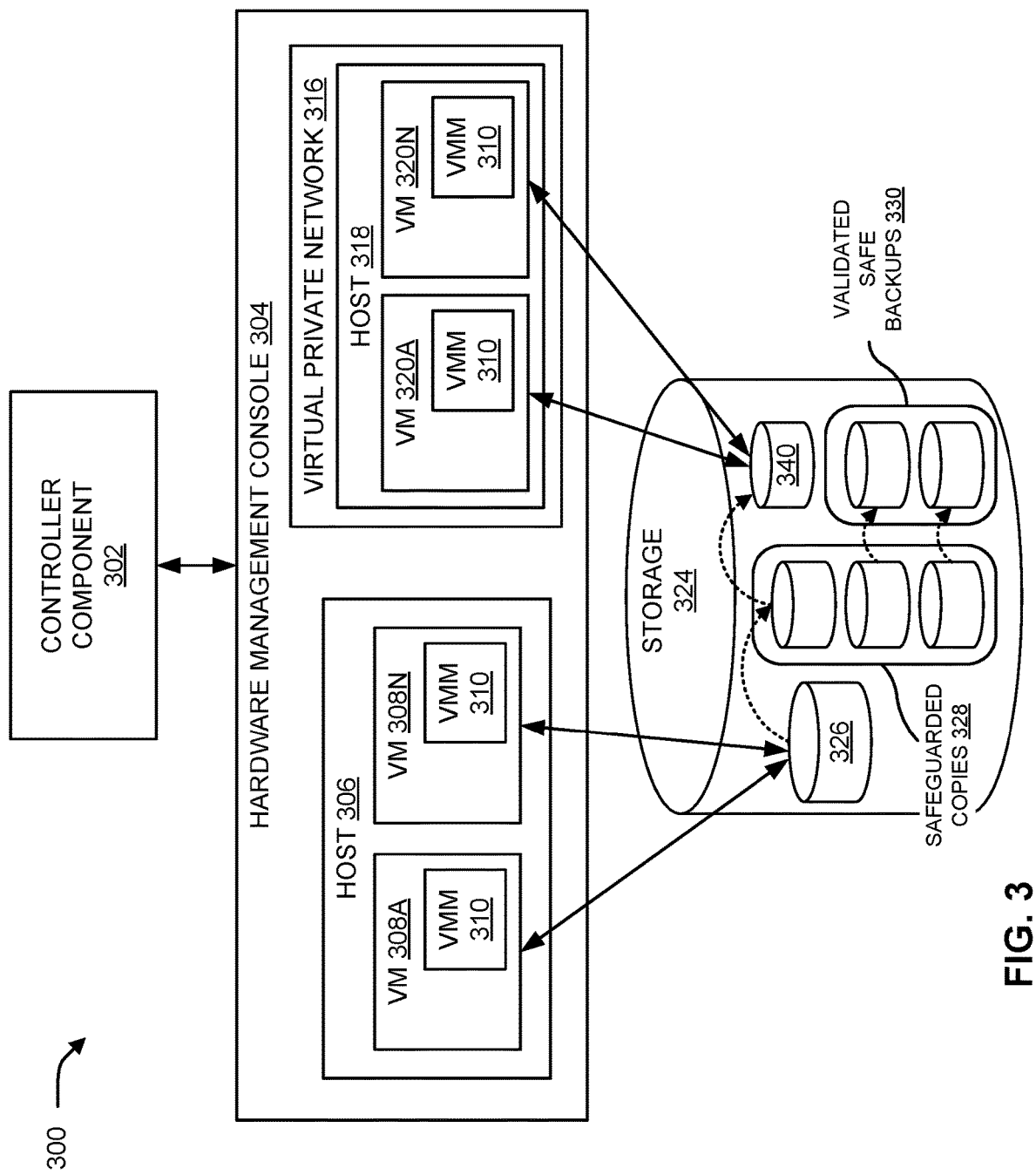
FIG. 3 is a block diagram illustrating an example computational environment implementing data integrity monitoring of point-in-time backups in a high-availability configuration, in accordance with some embodiments of the present disclosure.

Moving now to FIG. 3, a block diagram illustrates an example computational environment 300 that implements data integrity monitoring of point-in-time backups for a high-availability system configuration, in accordance with some embodiments of the present disclosure. High-availability computing is a strategy for ensuring that a system is available, even in the event of a resource failure or other disruption. A high-availability configuration reduces system downtime in the event of a disruption using one or more of: redundancy, clustering, load balancing, failover, and/or monitoring. Redundancy in the context of a high-availability configuration can include multiple computing resources that can perform the same tasks, such that if one computing resource fails, another computing resource can take over the workload without an interruption. Clustering in the context of a high-availability configuration can comprise grouping computing resources to distribute workloads among the computing resources. Load balancing in the context of a high-availability configuration can comprise distributing incoming traffic across multiple computing resources to prevent overloading of a computing resource. Failover in a high-availability configuration switches operations to a backup computing resource in the event of a failure of a computing resource. Monitoring in the context of a high-availability configuration comprises monitoring of computing resources and data for potential problems that could cause a disruption.

As shown in FIG. 3, the computational environment 300 includes a hardware management console 304 for managing a host 306 which hosts one or more virtual machines 308A, 308N (collectively 308, where N can refer to any positive integer representing any number of virtual machines), and storage 324, which can comprise a storage subsystem. The example illustrated in FIG. 3 is implemented in the context of virtual machines. However, as will be appreciated, the illustrated example can be implemented in the context of containers.

The hardware management console 304 can comprise a physical or virtual appliance that is in network communication with a controller component 302 of a disaster recovery system. The controller component 302 interacts with the hardware management console 304 to collect configuration information of the host 306, and interacts with the virtual machine(s) 308 through the hardware management console 304 and a virtual machine monitor (VMM) 310. The controller component 302 regularly (e.g., periodically) creates point-in-time backups 326 of the system state and data of the virtual machine(s) 308. The controller component 302 safeguards the point-in-time backups 326 (shown as safeguarded copies 328) to prevent the point-in-time backups 326 from being compromised, either accidentally or deliberately.

Figure 4:
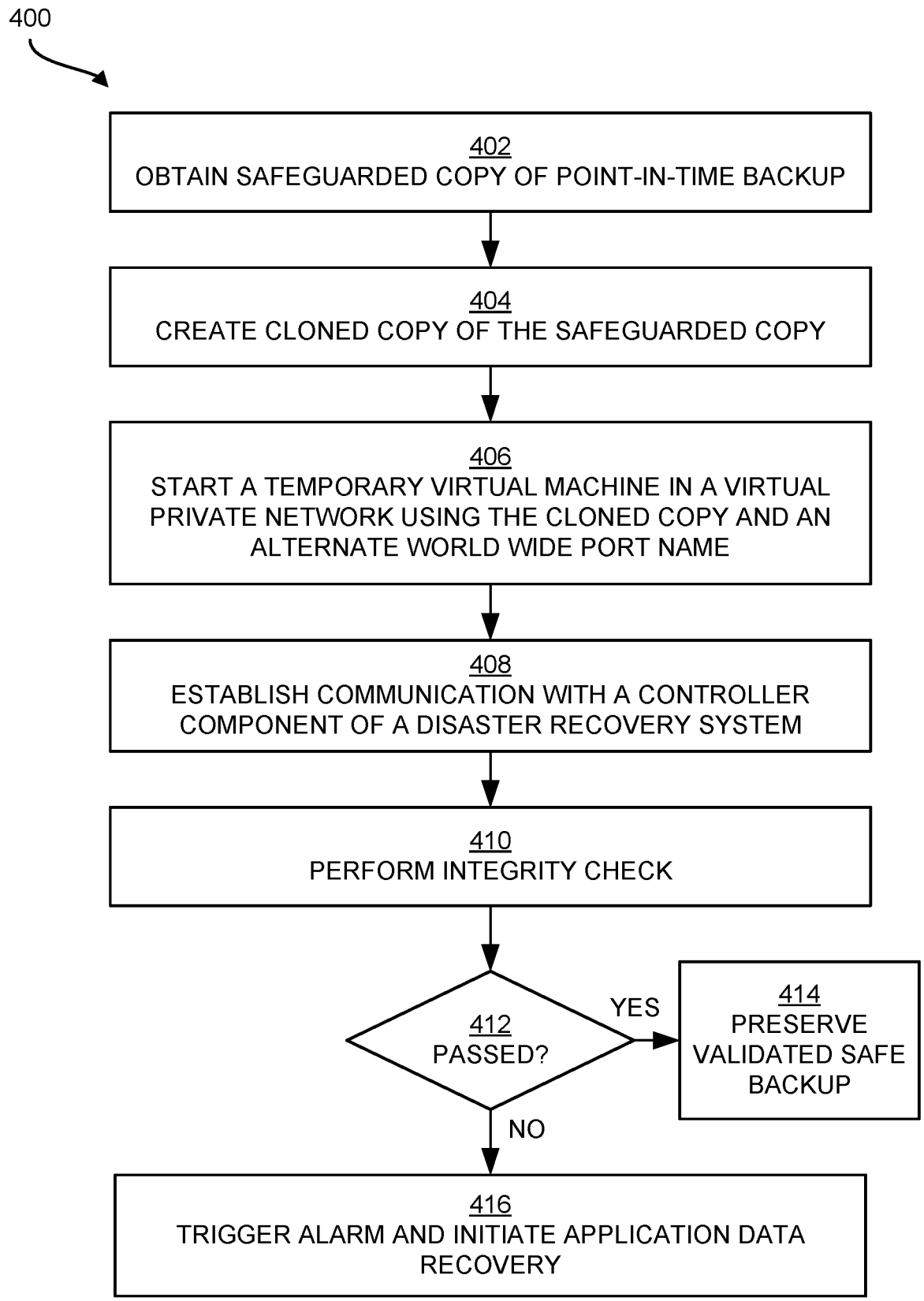
FIG. 4 is a flow diagram illustrating an example method for data integrity monitoring in a high-availability configuration, in accordance with some embodiments of the present disclosure.

Additionally, the controller component 302 performs data integrity monitoring of the point-in-time backups 326 by testing and validating the data in the point-in-time backups 326 to determine whether the point-in-time backups 326 have been compromised by malware. With continuing reference to FIG. 3, FIG. 4 illustrates an example of a method 400 for data integrity monitoring in a high-availability configuration, which can be performed by the controller component 302 of the disaster recovery system.

Starting in operation 402, the method 400 obtains a safeguarded copy 328 of a point-in-time backup 326 located in storage 324. Then in operation 404, the method 400 creates a cloned copy 340 of the safeguarded copy 328. The cloned copy 340 comprises a direct disk-to-disk copy of the safeguarded copy 328.

In operation 406, the method 400 starts one or more temporary virtual machines 320A, 320N (collectively 320, where N can refer to any positive integer representing any number of temporary virtual machines) in a virtual private network 316 using an alternate world wide port name (WWPN). The temporary virtual machine(s) 320 are started (booted) using the cloned copy 340 that includes the system state and data of the virtual machine(s) 308 captured in the point-in-time backup 326. Because the WWPN that maps a storage device to the virtual machine(s) 308 cannot be used to map the cloned copy 340 to the temporary virtual machine(s) 308, the alternate WWPN can be used to map the cloned copy 340 to the temporary virtual machine(s) 308. As background, each node in a storage system (e.g., storage 324) can be allocated a WWNN, and the WWNN can be used as the basis for a unique WWPN assigned to each port of the node. The WWPN can be persistent, meaning that a WWPN that maps a port to the virtual machine(s) 308 cannot be used to map the cloned copy 340 to the temporary virtual machine(s) 320. Therefore, an alternate WWPN can be generated, and the alternate WWPN can be provided to start the temporary virtual machine(s) 320 using the cloned copy 340. In some embodiments, the hardware management console 304 can generate two unique WWPNs for a virtual machine's network client adapter (e.g., virtual fibre channel (VFC) client adapter), and the WWPNs can be maintained in the virtual machine's profile. One of the WWPNs can be provided to the virtual machine(s) 308, and the other WWPN can be provided to the temporary virtual machine(s) 320.

In operation 408, the method 400 establishes communication with the controller component 302 of the disaster recovery system. As part of starting the temporary virtual machine(s) 320 from the cloned copy 340, the method 400 starts the virtual machine monitor 310, and the virtual machine monitor 310 establishes communication with the controller component 302 via the hardware management console 304.

In operation 410, the method 400 performs an integrity check of the data included in the point-in-time backup 326. As described earlier, in response to establishing communication with the temporary virtual machine(s) 320 via the virtual machine monitor 310, the controller component 302 initiates an integrity check of the data included in the point-in-time backup 326 using one or more scripts and/or applications that execute on the temporary virtual machine(s) 320 to perform the integrity check. The scripts and/or applications check the integrity, consistency, and correctness of the data captured in the point-in-time backup 326 to ensure that the data is in a usable and functional state. As will be appreciated, the integrity check performed in association with method 400 can include any technique to verify the reliability and completeness of data captured in a point-in-time backup 326.

Returning to operation 410, the results (e.g., pass/fail, error/timeout, etc.) of the integrity check can be provided to the controller component 302, via the virtual machine monitor 310, and in operation 412, the method 400 can determine whether, based on the results of the integrity check, the data captured in the point-in-time backup 326 passed the integrity check. In the case that the data captured in the point-in-time backup 326 passed the integrity check, then in operation 414, the method 400 preserves the safeguarded copy 328 of the point-in-time backup 326 as a protected validated safe backup 330, which can be used to restore the virtual machine(s) 308 in the event of a disaster. In the case that the results of the integrity check indicate that the data captured in the point-in-time backup 326 did not pass the integrity check, then in operation 416, the method 400 can trigger an alarm and initiate an application data recovery procedure that restores the virtual machine(s) 308 to a point-in-time of a last validated safe backup 330.

Figure 6:
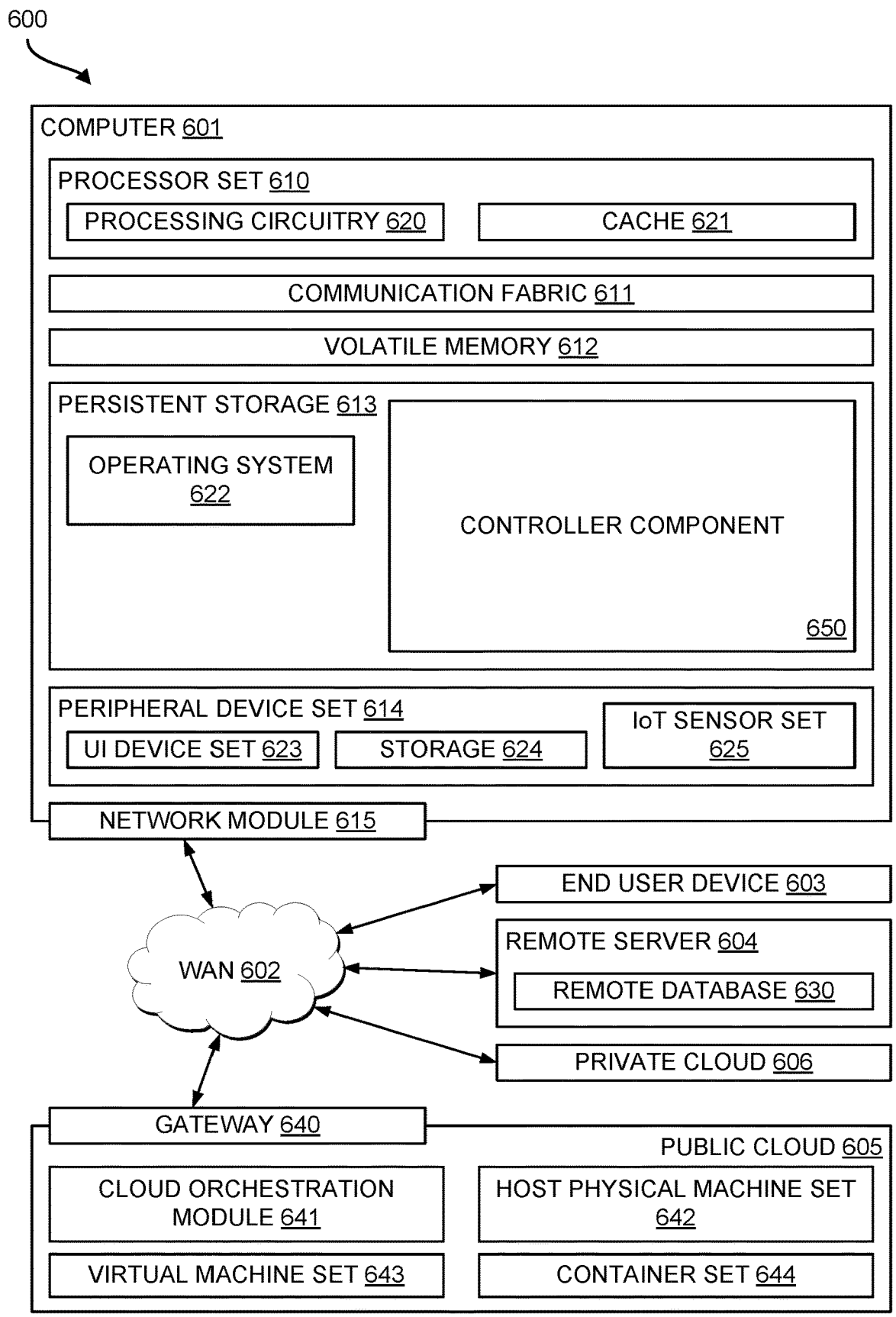
FIG. 6 is a block diagram illustrating an example computing environment in which aspects of the present disclosure can be implemented, in accordance with some embodiments of the present disclosure.

Although FIG. 1, FIG. 2, FIG. 3, and FIG. 4 illustrate examples of the present disclosure in the context of virtual machines, it will be appreciated that the illustrated examples can also be implemented in the context of containers. All or a portion of the computational environments illustrated in FIG. 1 and FIG. 3 can be implemented, for example by all or a subset of the computing environment 600 of FIG. 6. In some embodiments, the controller component illustrated in FIG. 1 and FIG. 3 is isolated, such that the recovery manager does not communicate with external systems except for a hardware management console and a storage system. The controller component communicates with the hardware management console and storage system using one or more application programming interfaces (APIs), which can include representational state transfer (REST) APIs. The controller component can be implemented in software, hardware, firmware or a combination thereof. When software is used, the operations performed by the controller component can be implemented in program instructions configured to run on hardware, such as a processor. When firmware is used, the operations can be implemented in program instructions and data, and stored in persistent memory to run on a processor. When hardware is employed, the hardware can include circuits that operate to perform the operations.

In some embodiments, one or more modules implement the controller component, where the modules (also referred to as program modules) include routines, programs, components and/or data structures that perform the tasks and/or implement the operations described in association with the controller component. In some embodiments, the modules can be implemented as computing services hosted in a computing service environment. For example, a module can be considered a service with one or more processes executing on a server or other computer hardware. Such services can provide a service application that receives requests and provides output to other services or consumer devices. An API can be provided for each module to enable a first module to send requests to and receive output from a second module. Such APIs can also allow third parties to interface with the module and make requests and receive output from the modules. While FIG. 1 and FIG. 3 illustrate examples of computational environments that can implement the techniques above, many other similar or different environments are possible. The example environments discussed and illustrated above are merely representative and not limiting.

Figure 5:
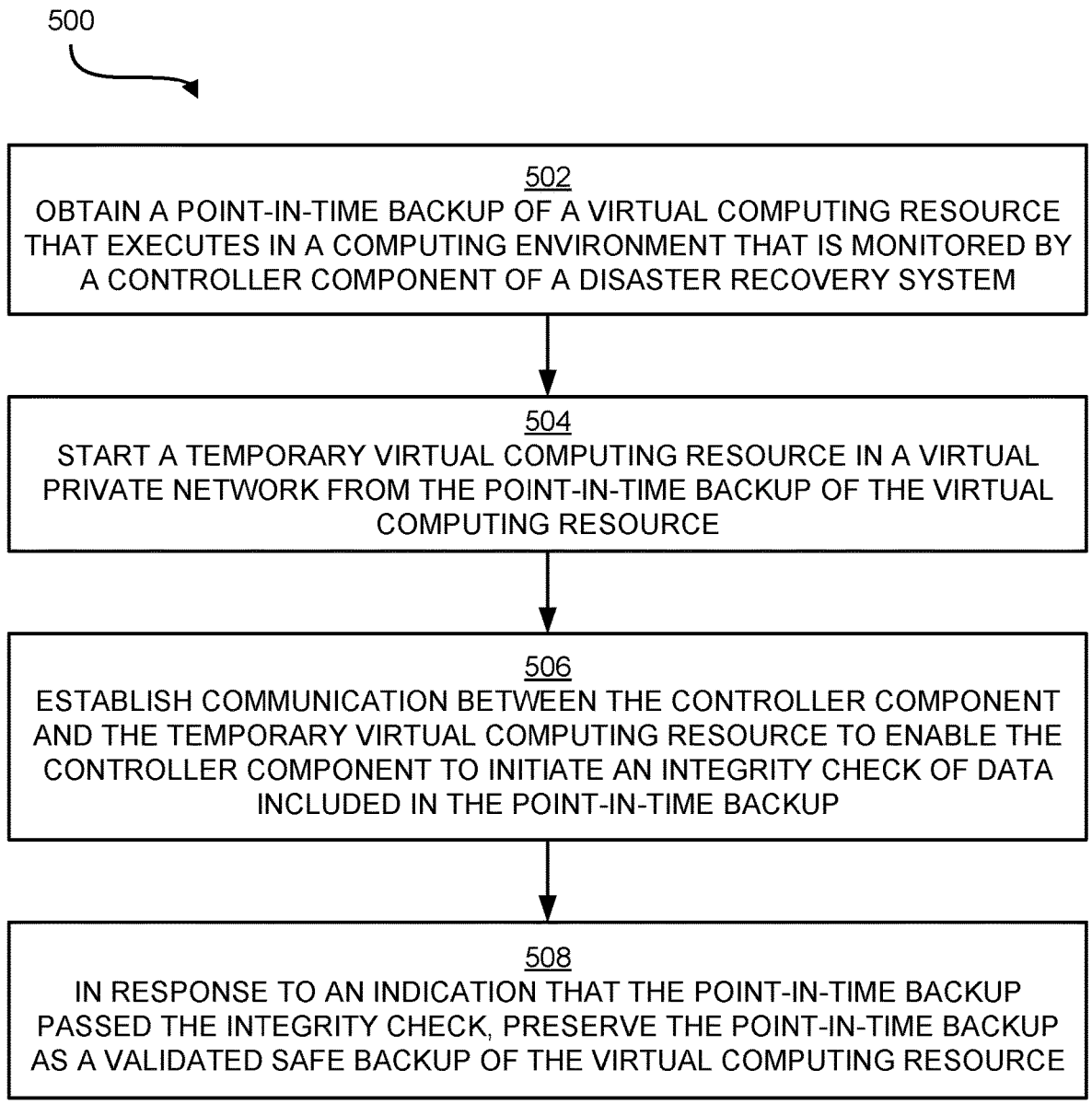
FIG. 5 is a flow diagram illustrating an example method for performing an integrity check on a point-in-time backup of a virtual computing resource, in accordance with some embodiments of the present disclosure.

FIG. 5 is a flow diagram illustrating an example method 500 for data integrity monitoring of point-in-time backups, in accordance with some embodiments of the present disclosure. In operation 502, the method 500 obtain a point-in-time backup of a virtual computing resource that executes in a computing environment that is monitored by a controller component. The computing environment in which the virtual computing resource executes can be a production environment in which software products and/or services are put into operation for use by end users, and the point-in-time backup of the virtual computing resource can include application data and configuration information for the virtual computing resource. In some embodiments, obtaining the point-in-time backup can comprise identifying a most recent point-in-time backup of the virtual computing resource generated by a disaster recovery system that recurrently generates point-in-time backups of the virtual computing resource.

In operation 504, the method 500 starts a temporary virtual computing resource in a virtual private network from the point-in-time backup of the virtual computing resource. The temporary virtual computing resource can be created to have a same configuration as a corresponding virtual computing resource located in a production environment. For example, the temporary virtual computing resource can be started from the point-in-time backup to create an exact copy of the virtual computing resource located in the production environment.

In a high-availability configuration, a virtual private network can be created in a production environment that includes the virtual computing resource that is recurrently backed up by the disaster recovery system, and the temporary virtual computing resource can be launched in the virtual private network to isolate the temporary virtual computing resource from production resources. Because a WWPN used to connect the virtual computing resource to storage cannot be utilized by the temporary virtual computing resource, the method 500 can provide an alternative WWPN that enables the temporary virtual computing resource to connect to storage containing the point-in-time backup.

In operation 506, the method 500 establishes communication between the controller component and the temporary virtual computing resource to enable the controller component to initiate an integrity check of data included in the point-in-time backup. In some embodiments, the controller component initiates one or more scripts and/or applications to execute on the temporary virtual computing resource and perform the integrity check. The scripts and/or applications can check the integrity, consistency, and correctness of the data captured in the point-in-time backup. After performing the integrity check, in some embodiments, the method 500 can initiate a deletion of the temporary virtual computing resource from the virtual private network.

In operation 508, in response to an indication that the data in the point-in-time backup passed the integrity check, the method 500 preserves the point-in-time backup as a safe backup of the virtual computing resource. For example, in passing the integrity check, the point-in-time backup has been validated as being safe from malware; and the validated point-in-time backup can then be safeguarded (e.g., isolated from production data) to enable restoration of the virtual computing resource from the validated point-in-time backup in the event of a disaster. In some embodiments, as part of preserving the point-in-time backup as a safe backup, the method 500 identifies a safeguard policy that defines parameters for creating and retaining safe backups of the virtual computing resource, and manages the safe backups of the virtual computing resource according to the parameters of the safeguard policy.

Alternatively, in response to an indication that the point-in-time backup failed the integrity check, the method 500 can provide a notification to indicate that the point-in-time backup failed the integrity check. The notification can include information associated with the virtual computing resource, the point-in-time backup, the type of tests performed by the integrity check, the results of the integrity check, and other information. The notification can be provided to a user (e.g., system administrator), who in response to receiving the notification, can initiate a disaster recovery procedure. Also, in response to the indication that the point-in-time backup failed the integrity check, the method 500 in some embodiments can delete the point-in-time backup of the virtual computing resource. Moreover, in some embodiments, the method 500 can automate recovery of the virtual computing resource by identifying a safe backup of the virtual computing resource, and initiating the recovery of the virtual computing resource using the safe backup (e.g., via a recovery script or application).

The method 500 described above can be performed by a computer (e.g., computer 601 in FIG. 6), performed in a cloud environment (e.g., clouds 606 or 605 in FIG. 6), and/or generally can be implemented in fixed-functionality hardware, configurable logic, logic instructions, etc., or any combination thereof. In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the disclosed methods, such as computer code in block 650 for a controller component that performs data integrity monitoring of point-in-time backups. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 621 and the other storage media discussed below. The computer readable program instructions, and associated data, are accessed by processor set 610 to control and direct performance of the disclosed methods. In computing environment 600, at least some of the instructions for performing the disclosed methods may be stored in block 650 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface type operating systems that employ a kernel. The code included in block 650 typically includes at least some of the computer code involved in performing the disclosed methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the disclosed methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. The terms "comprises," "comprising," "includes," "including," "has," "having," "contains" or "containing," or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. The term "user" refers to an entity (e.g., an individual(s), a computer, or an application executing on a computer). It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure. Note further that numerous aspects or features are disclosed herein, and unless inconsistent, each disclosed aspect or feature is combinable with any other disclosed aspect or feature as desired for a particular application of the concepts disclosed.

As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art. Any advantages discussed in the present disclosure are example advantages, and embodiments of the present disclosure can exist that realize all, some, or none of any of the discussed advantages while remaining within the spirit and scope of the present disclosure.

It will be further appreciated that various aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the various aspects described, the practical application or technical improvement over technologies found in the marketplace, or to enable others of ordinary skill in the art to understand the approaches disclosed herein.

What is claimed is:

1. A system comprising:
one or more computer readable storage media storing program instructions and one or more processors which, in response to executing the program instructions, are configured to:
obtain a point-in-time backup of a virtual computing resource that executes in a computing environment which is monitored by a controller component of a disaster recovery system;
start a temporary virtual computing resource in a virtual private network from the point-in-time backup of the virtual computing resource;
establish communication between the controller component and the temporary virtual computing resource to enable the controller component to initiate an integrity check of data included in the point-in-time backup; and
in response to an indication that the point-in-time backup passed the integrity check, preserve the point-in-time backup as a validated safe backup of the virtual computing resource.

2. The system of claim 1, wherein the program instructions are further configured to cause the one or more processors to:
in response to an indication that the point-in-time backup failed the integrity check, provide a notification to indicate that the point-in-time backup failed the integrity check; and
delete the point-in-time backup of the virtual computing resource.

3. The system of claim 1, wherein the program instructions are further configured to cause the one or more processors to:
in response to an indication that the point-in-time backup failed the integrity check, identify a last validated safe backup of the virtual computing resource; and
initiate a recovery of the virtual computing resource using the last validated safe backup of the virtual computing resource.

4. The system of claim 1, wherein the program instructions configured to cause the one or more processors to obtain the point-in-time backup of the virtual computing resource are further configured to cause the one or more processors to:
identify a most current point-in-time backup of the virtual computing resource generated by the disaster recovery system, wherein the disaster recovery system recurrently generates point-in-time backups of the virtual computing resource to include application data and configuration information for the virtual computing resource; and
safeguard the most current point-in-time backup.

5. The system of claim 1, wherein the program instructions configured to cause the one or more processors to start the temporary virtual computing resource in the virtual private network are further configured to cause the one or more processors to:
create the virtual private network in a high-availability computing environment that hosts the virtual computing resource; and
generate an alternative world wide port name (WWPN) for connecting the temporary virtual computing resource to storage containing the point-in-time backup.

6. The system of claim 1, wherein the program instructions are further configured to cause the one or more processors to delete the temporary virtual computing resource after the integrity check has been performed.

7. The system of claim 1, wherein the program instructions configured to cause the one or more processors to preserve the point-in-time backup as the validated safe backup of the virtual computing resource are further configured to cause the one or more processors to:
identify a safeguard policy that defines parameters for creating and retaining validated safe backups of the virtual computing resource; and
manage the validated safe backups of the virtual computing resource according to the safeguard policy.

8. A computer-implemented method comprising:
obtaining a point-in-time backup of a virtual computing resource that executes in a computing environment which is monitored by a controller component of a disaster recovery system;
starting a temporary virtual computing resource in a virtual private network from the point-in-time backup of the virtual computing resource;
establishing communication between the controller component and the temporary virtual computing resource to enable the controller component to initiate an integrity check of data included in the point-in-time backup; and
in response to an indication that the point-in-time backup passed the integrity check, preserving the point-in-time backup as a validated safe backup of the virtual computing resource.

9. The computer-implemented method of claim 8, further comprising:
in response to an indication that the point-in-time backup failed the integrity check, provide a notification to indicate that the point-in-time backup failed the integrity check; and
deleting the point-in-time backup of the virtual computing resource.

10. The computer-implemented method of claim 8, further comprising:
in response to an indication that the point-in-time backup failed the integrity check, identifying a last validated safe backup of the virtual computing resource; and
initiating a recovery of the virtual computing resource using the last validated safe backup of the virtual computing resource.

11. The computer-implemented method of claim 8, wherein obtaining the point-in-time backup of the virtual computing resource further comprises:
identifying a most current point-in-time backup of the virtual computing resource generated by the disaster recovery system, wherein the disaster recovery system recurrently generates point-in-time backups of the virtual computing resource to include application data and configuration information for the virtual computing resource; and
safeguarding the most current point-in-time backup.

12. The computer-implemented method of claim 8, wherein starting the temporary virtual computing resource in the virtual private network further comprises:
creating the virtual private network in a high-availability computing environment that hosts the virtual computing resource; and
generating an alternative world wide port name (WWPN) for connecting the temporary virtual computing resource to storage containing the point-in-time backup.

13. The computer-implemented method of claim 8, further comprising deleting the temporary virtual computing resource after the integrity check has been performed.

14. The computer-implemented method of claim 8, wherein preserving the point-in-time backup as the validated safe backup of the virtual computing resource further comprises:
   identifying a safeguard policy that defines parameters for creating and retaining validated safe backups of the virtual computing resource; and
   managing the validated safe backups of the virtual computing resource according to the safeguard policy.

15. A computer program product comprising:
   one or more computer readable storage media, and program instructions collectively stored on the one or more computer readable storage media, the program instructions configured to cause one or more processors to:
   obtain a point-in-time backup of a virtual computing resource that executes in a computing environment which is monitored by a controller component of a disaster recovery system;
   start a temporary virtual computing resource in a virtual private network from the point-in-time backup of the virtual computing resource;
   establish communication between the controller component and the temporary virtual computing resource to enable the controller component to initiate an integrity check of data included in the point-in-time backup; and
   in response to an indication that the point-in-time backup passed the integrity check, preserve the point-in-time backup as a validated safe backup of the virtual computing resource.

16. The computer program product of claim 15, wherein the program instructions are further configured to cause the one or more processors to:
   in response to an indication that the point-in-time backup failed the integrity check, provide a notification to indicate that the point-in-time backup failed the integrity check; and
   delete the point-in-time backup of the virtual computing resource.

17. The computer program product of claim 15, wherein the program instructions are further configured to cause the one or more processors to:
   in response to an indication that the point-in-time backup failed the integrity check, identify a last validated safe backup of the virtual computing resource; and
   initiate a recovery of the virtual computing resource using the last validated safe backup of the virtual computing resource.

18. The computer program product of claim 15, wherein the program instructions configured to cause the one or more processors to obtain the point-in-time backup of the virtual computing resource are further configured to cause the one or more processors to:
   identify a most current point-in-time backup of the virtual computing resource generated by the disaster recovery system, wherein the disaster recovery system recurrently generates point-in-time backups of the virtual computing resource to include application data and configuration information for the virtual computing resource; and
   safeguard the most current point-in-time backup.

19. The computer program product of claim 15, wherein the program instructions configured to cause the one or more processors to start the temporary virtual computing resource in the virtual private network are further configured to cause the one or more processors to:
   create the virtual private network in a high-availability computing environment that hosts the virtual computing resource; and
   generate an alternative world wide port name (WWPN) for connecting the temporary virtual computing resource to storage containing the point-in-time backup.

20. The computer program product of claim 15, wherein the program instructions are further configured to cause the one or more processors to delete the temporary virtual computing resource after the integrity check has been performed.

* * * * *